United States Patent [19]
Craddock, III et al.

[11] Patent Number: 5,399,320
[45] Date of Patent: Mar. 21, 1995

[54] METHOD AND APPARATUS FOR STOPPING REACTION IN A GAS PHASE POLYMERIZATION REACTOR SYSTEM

[76] Inventors: Roy E. Craddock, III, Rte. 7, Box 253-A; John M. Jenkins, III, 1405 Village Dr., both of So. Charleston, W. Va. 25309; Michael T. Tighe, 1386 Nottingham Rd., Charleston, W. Va. 25314

[21] Appl. No.: 119,714

[22] Filed: Sep. 10, 1993

Related U.S. Application Data

[62] Division of Ser. No. 827,649, Jan. 29, 1992, Pat. No. 5,270,408.

[51] Int. Cl.6 .......................... C08F 2/00; G05B 9/00
[52] U.S. Cl. ........................... 422/138; 422/111; 422/117; 422/131; 422/234; 526/82
[58] Field of Search ............... 422/111, 117, 131, 138, 422/141, 234; 526/82, 84

[56] References Cited

U.S. PATENT DOCUMENTS

| | | | |
|---|---|---|---|
| 4,326,048 | 4/1982 | Stevens et al. | 526/68 |
| 4,328,186 | 5/1982 | Karam | 422/132 |
| 4,372,919 | 2/1983 | Kubo et al. | 422/137 |
| 4,482,687 | 11/1984 | Noshay et al. | 526/125 |
| 4,547,555 | 10/1985 | Cook et al. | 526/82 |
| 4,666,999 | 5/1987 | Cook et al. | 526/82 |
| 4,786,695 | 11/1988 | Cook et al. | 526/82 |
| 4,826,662 | 5/1989 | Mao et al. | 422/190 |
| 4,834,947 | 5/1989 | Cook et al. | 422/117 |

*Primary Examiner*—Robert J. Warden
*Assistant Examiner*—Christopher Y. Kim

[57] ABSTRACT

A method of terminating, under emergency conditions, an olefin polymerization reaction conducted in the presence of a transitioned metal based catalyst in a gas phase reactor by using a recycle gas from the reactor or a feed stream to the reactor to operate an expander associated with a circulator which maintains fluidized conditions in the reactor while introducing a kill gas into the reactor to terminate the reaction.

2 Claims, 2 Drawing Sheets

METHOD AND APPARATUS FOR STOPPING REACTION IN A GAS PHASE POLYMERIZATION REACTOR SYSTEM

This is a divisional of application Ser. No. 07/827,649, filed Jan. 29, 1992, now U.S. Pat. No. 5,270,408.

BACKGROUND OF THE INVENTION

This invention relates to a method for terminating a reaction in a gas phase polymerization system.

It is of course well known that a significant portion of alpha-olefin homopolymer or copolymer, e.g., ethylene copolymer polymerizations are presently being conducted in fluidized bed reactors. Karol, et al. U.S. Pat. No. 4,302,566 discloses a typical fluidized bed reactor which is presently used for the preparation of ethylene copolymers in a fluidized bed reactor. As suggested in this patent, it is essential to operate the fluid bed reactor at a temperature below the sintering temperature of the polymer particles (Note column 12, lines 39-53 of Karol et al. U.S. Pat. No. 4,302,566).

In normal operation, the temperature of the fluidized bed is primarily controlled by passing recycle gas through a circulator e.g., a compressor and then through a heat exchanger, wherein the recycle gas is cooled to remove the heat of reaction before it is returned to the fluidized bed (Note column 11, lines 35-53).

If the circulator in the fluidized bed arrangement fails, e.g., due to electrical or mechanical failure, the cooling means for controlling the temperature in the bed becomes inoperative. Since olefin reactants are still in contact with active catalyst, exothermic heat of reaction causes the temperature of the bed to climb toward sintering temperatures in a run-away fashion.

Unfortunately, however, allowing the polymerization reaction to continue during emergency situations could cause severe future operating problems. In a gas phase fluidized bed polymerization reaction system, loss of fluidizing gas flow with continued reaction normally results in melting of the polymer powder and the formation of a molten chunk. The worst case would be caused by a complete loss of utilities—electric power, cooling water, instrument air, steam, etc.

As a result, when necessary, the art has resorted to various techniques for terminating a fluidized bed polymerization in the shortest possible time. Thus in one such technique, Stevens et al. U.S. Pat. No. 4,326,048 describes a method for terminating a gas phase olefin polymerization by injecting a carbon oxide. The injection of the carbon oxide may take place downstream of the polymerization reactor, e.g., in the recycle gas line (Note Column 4 lines 29-33 of the Stevens et al. U.S. Pat. No. 4,326,048).

In another technique, Charsley U.S. Pat. No. 4,306,044 discloses a means for introducing carbon dioxide into a gas-phase olefin polymerization system to at least reduce the rate of polymerization. For example, the carbon dioxide can be injected manually when the polymerization does not respond to other means of control. One other means of control is by rapid venting of the reactor as fast as possible in an attempt to control the run-away reaction. In this regard it is noted that the fluidized bed system as described in Karol et al. U.S. Pat. No. 4,302,566 is expressly provided with a venting system for shutdown. Venting systems of the prior art are relatively large and create additional problems.

Accordingly, these remedies are not entirely satisfactory because of economic and environmental considerations. Hence, there is still a need in the art for killing a reaction by techniques which do not require a large venting system.

SUMMARY OF THE INVENTION

In a gas phase fluidized bed polymerization reaction system, loss of fluidizing gas flow with continued reaction can result in melting of the polymer powder and the formation of a molten chunk. The worst case would be caused by a complete loss of utilities—electric power, cooling water, instrument air, steam, etc. As mentioned previously in the past, fluidized bed reactors have been "killed" by injecting a poison e.g. carbon monoxide and depressuring the system rapidly to a flare or to the atmosphere. A new system is desired which avoids the need for rapid reactor blowdown.

The present invention provides a method for stopping or "killing" a polymerization reaction by providing an auxiliary means for continuing rotation of the cycle gas circulator after a power failure for sufficient time to circulate a catalyst poison throughout the fluidized bed. The invention preferably utilizes gas driven auxiliary means, e.g., an expander for the cycle gas circulator utilizing either gas from the reactor itself or gaseous monomer from the reactor feed system to drive the expander in case of loss of electric power.

In a broad aspect therefore, the present invention provides a method of terminating, under emergency conditions, an olefin polymerization reaction conducted in the presence of a transition metal-based catalyst in a gas phase reactor wherein a monomer feed stream is introduced into said reactor, a cycle gas comprising monomer, comonomer, hydrogen and diluents is discharged from said reactor and directed through a circulator and at least one heat exchanger, and thereafter returning said cooled recycle gas to said reactor, the improvement in the method of terminating said olefin polymerization reaction which comprises introducing a kill gas into said reactor in an amount sufficient to terminate the reaction in said reactor, directing at least a portion of said recycle gas from said reactor or said feed stream, through auxiliary driving means associated with said circulator to maintain operation of said circulator at a level such as to maintain fluidized conditions in said reactor, said kill gas being directed through said reactor for a period of time sufficient to insure that said kill gas comes into contact with substantially all of said catalyst in said reactor.

The present invention also provides an apparatus for terminating a polymerization reaction in fluidized bed polymerization reaction system including a polymerization reactor, circulator means for circulating a recycle stream from said reactor and at least one cooling means for cooling said recycle stream, said apparatus comprising kill gas entry means for delivering a kill gas to said reactor; gas driven auxiliary means associated with said circulator for maintaining operation of said circulator during power failures, and valve means associated with said gas driven auxiliary means for selectively directing said gas to said gas driven auxiliary means.

DETAILED DESCRIPTION

Figure 1:
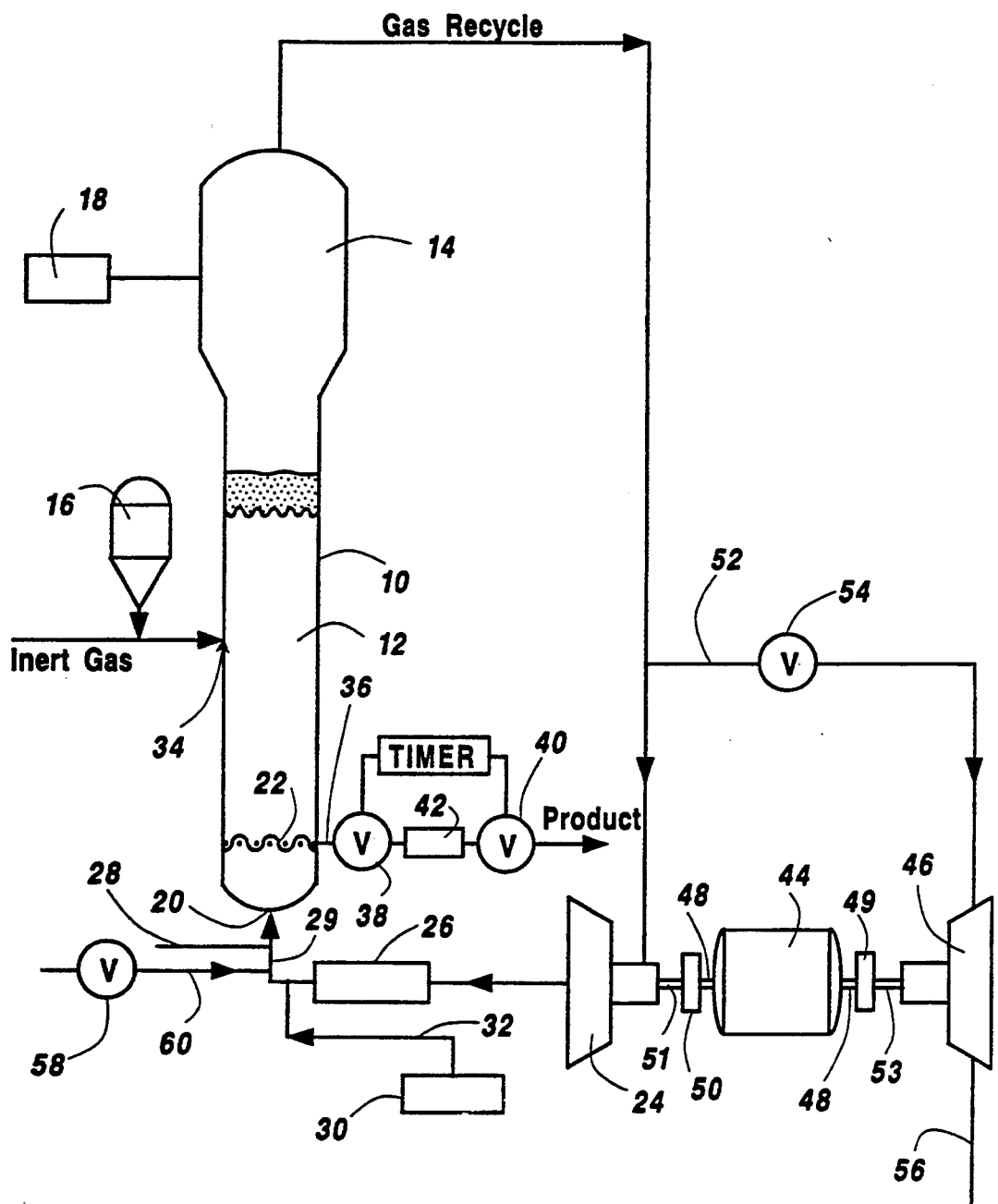
FIG. 1 is a schematic representation of one embodiment for practicing the method of the present invention.
Figure 2:
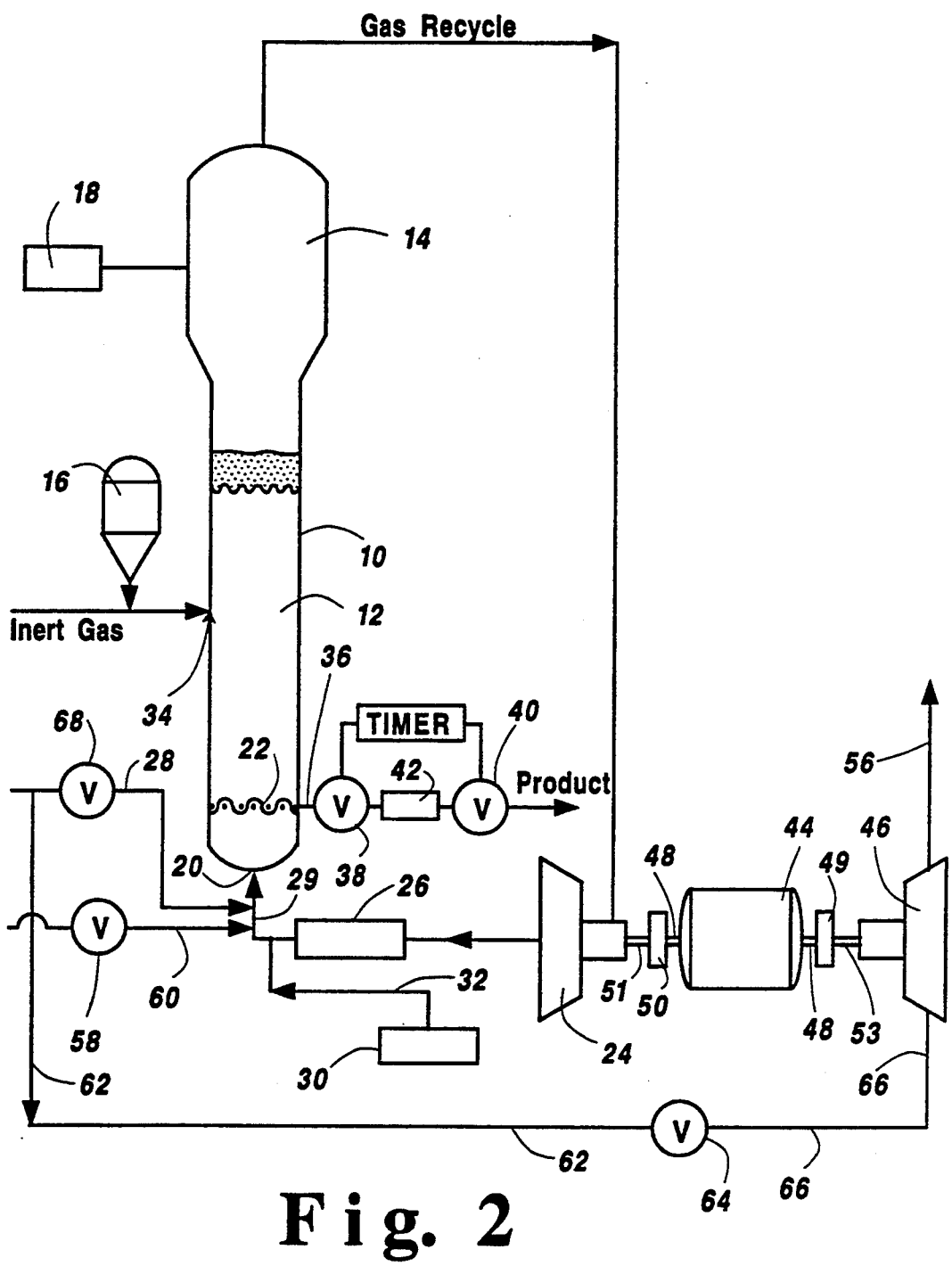
FIG. 2 is a schematic representation of a seconded embodiment for practicing the method of the present invention.

The invention can be practiced in connection with any process typically employed to produce olefins, e.g., ethylene or propylene homopolymers or copolymers by a gas fluidized bed reactor process. Merely as illustrative, the fluidized bed reactor can be as described in U.S. Pat. Nos. 4,482,687, or 4,302,566 or another conventional reactor for the gas phase production of, for example, polyethylene, polypropylene or ethylene copolymers and terpolymers provided they have been modified such as shown in FIGS. 1 and 2. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas and/or induced condensing agent. A typical cycle gas is comprised of ethylene, nitrogen, hydrogen, and propylene, butene, hexene monomers or dienes, either alone or in combination.

OPERATING EQUIPMENT

The equipment which can be utilized is basically the same equipment used in conventional fluidized bed polymerization systems. Thus the process utilizes a conventional fluidized bed polymerization reactor, with appropriate recycle, feed, and catalyst lines, conventional heat exchangers and a compressor or circulator. The circulator however is operatively associated with an auxiliary driving means adapted to maintain operation of the circulator during power failure. The auxiliary driving means receives input power from a pressurized gas which can be the recycle gas from the reactor or alternatively from the pressurized monomer feed gas. The auxiliary means is preferably an expander which is operatively connected to the circulator through a motor. The expander is conventional in the art and can be obtained from a variety of commercial sources. The equipment also includes strategically positioned control devices such as valves which regulate the gas input to the circulator and the reactor. FIG. 1 indicates one technique for carrying out the method of the present invention. Referring to FIG. 1 there is illustrated a conventional fluidized bed reaction system for polymerizing alpha olefins which includes a reactor 10 which consists of a reaction zone 12 and a velocity reduction zone 14.

The reaction zone 12 includes a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed is normally maintained above the minimum flow required for fluidization, and preferably from about 1.5 to about 10 tim $G_{mf}$ and more preferably from about 3 to about 6 times $G_{mf}$. $G_{mf}$ is used in the accepted form as the abbreviation for the minimum gas flow required to achieve fluidization, C. Y. Wen and Y. H. Yu, "Mechanics of Fluidization", Chemical Engineering Progress Symposium Series, Vol. 62, p.100–111 (1966).

It is highly desirable that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer articles as the first product. Eventually, a fluidized bed of the desired polymer particles supplants the start up bed.

The appropriate catalyst used in the fluidized bed is preferably stored for service in a reservoir 16 under a blanket of a gas which is inert to the stored material, such as nitrogen or argon.

Fluidization is achieved by a high rate of gas recycle to and through the bed, typically in the order of about 50 times the rate of feed of make up gas. The fluidized bed has the general appearance of a dense mass of viable particles in possible free-vortex flow as created by the percolation of gas through the bed. The pressure drop through the bed is egual to or slightly greater than the mass of the bed divided by the cross-sectional area. It is thus dependent on the geometry of the reactor.

Make-up gas or liquid is fed to the bed at a rate approximately equal to the rate at which particulate polymer product is withdrawn. A gas analyzer 18 is positioned above the bed. The gas analyzer determines the composition of the gas being recycled and the composition of the make-up gas and/or liquid is adjusted accordingly to maintain an essentially steady state gaseous composition within the reaction zone.

To insure complete fluidization, the recycle gas and, where desired, part or all of the make-up gas and/or liquid are returned to the reactor at base 20 below the bed. Gas distribution plate 22 positioned above the point of return ensures proper gas distribution and also supports the resin bed when gas flow is stopped.

The portion of the gas stream which does not react in the bed constitutes the recycle gas which is removed from the polymerization zone, preferably by passing it into velocity reduction zone 14 above the bed where entrained particles are given an opportunity to drop back in to the bed.

The recycle gas is then circulated by circulator 24 and passed through a heat exchanger 26 wherein it is cooled to remove the heat of reaction before it is returned to the bed. By constantly removing heat of reaction, no noticeable temperature gradient appears to exist within the upper portion of the bed. A temperature gradient will exist in the bottom of the bed in a layer of about 6 to 26 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady conditions. The recycle is then returned to the reactor at its base 20 and to the fluidized bed through distribution plate 22. The circulator 24 can also be placed downstream of heat exchanger 26.

Hydrogen may be used as a chain transfer agent for conventional polymerization reactions of the types contemplated herein. In the case where ethylene is used as a monomer the ratio of hydrogen/ethylene employed will vary between about 0 to about 2.0 moles of hydrogen per mole of the monomer in the gas stream.

The hydrogen, nitrogen monomer and comonomer feedstream (gas feed) are introduced into line 29 through line 28 where it then enters the bottom of reactor 10.

Any gas inert to the catalyst and reactants can also be present in the gas stream. The cocatalyst is added to the gas recycle stream upstream of its connection with the reactor as from dispenser 30 through line 32.

As is well known, it is essential to operate the fluid bed reactor at a temperature below the sintering temperature of the polymer particles. Thus to insure that sintering will not occur, operating temperatures below sintering temperatures are desired. For example, for the production of ethylene polymers an operating temperature of from about 90° C. to 100° C. is preferably used to prepare products having a density of about 0.94 to 0.97 while a temperature of about 75° C. to 95° C. is preferred for products having a density of about 0.91 to 0.94.

Normally the fluid bed reactor is operated at pressures of up to about 1000 psi, and is preferably operated at a pressure of from about 150 to 550 psi, with operation at the higher pressures in such ranges favoring heat transfer since an increase in pressure increases the unit volume heat capacity of the gas.

The catalyst is injected into the bed at a rate equal to its consumption at a point 34 which is above the distribution plate 22. A gas which is inert to the catalyst such as nitrogen or argon is used to carry the catalyst into the bed. Injecting the catalyst at a point above distribution plate 22 is an important feature. Since the catalysts normally used are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

Under a given set of operating conditions, the fluidized bed is maintained at essentially a constant height by withdrawing a portion of the bed as product at a rate equal to the rate of formation of the particular polymer product. Since the rate of heat generation is directly related to product formation, a measurement of the temperature rise of the gas across the reactor (the difference between inlet gas temperature and exist gas temperature) is determinative of the rate of the particulate polymer formation at a constant gas velocity.

The particulate polymer product is preferably withdrawn at a point 36 at or close to distribution plate 22. The particulate polymer product is conveniently and preferably withdrawn through the sequential operation of a pair of timed valves 38 and 40 defining a segregation zone 42. While valve 40 is closed, valve 38 is opened to emit a plug of gas and product to the zone 42 between it and valve 38 which is then closed. Valve 40 is then opened to deliver the product to an external recovery zone and after delivery, valve 40 is then closed to await the next product recovery operation.

Finally, the fluidized bed reactor is equipped with an adequate venting system (although significantly smaller than prior art systems) to allow venting the bed during the start up and shut down. The reactor does not require the use of stirring means and/or wall scraping means.

The reactor vessel is normally constructed of carbon steel and is designed for the operating conditions stated above.

Modifications to the conventional system are required when it is desired to terminate the reaction during power failures and other type emergencies. Thus, referring again to FIG. 1, it will be seen that circulator 24 which is driven by double extended shaft motor 44 is associated with expander 46 in a manner such that rotation of double extended shaft 48 will cause operation of circulator 24 even when motor 44 is not operating. This is permitted by coupling shaft 48 to couplers 49, 50 which couple shaft 48 to shaft 51 of circulator 24 and shaft 48 to shaft 53 of expander 46. Expander 46 receives its driving force from recycle gas which is directed into bypass recycle gas line 52 in which is positioned a valve 54. When valve 54 is opened it will be seen that at least a portion of recycle gas will flow into expander 46 to serve as a driving force. The flow of gas through expander 46 provides the power required to keep circulator 24 and motor 44 running at speeds sufficient to maintain fluidization. Gas circulation is maintained through the reaction system, and the fluidized bed 12 is maintained in a fluidized state. The gas which is used to drive expander 46 passes through line 56, leaving the reaction system at relatively low pressure. Normally, this is a relatively small gas flow, and it can be disposed of in a conventional flare system or other means of disposal.

The modified reaction system also includes a means for introducing a kill gas to the system. Thus referring again to FIG. 1, a kill gas such as a carbon oxide gas preferably carbon monoxide can be introduced into reactor 10 by opening valve 58 which permits the kill gas to flow through line 60 and eventually into the bottom portion of reactor 10. Line 60 may alternately connect directly to reactor 10 or to some other portion of the reaction system. By this arrangement it is evident that the gas circulation maintained by the action of expander 46 carries the catalyst poison into the fluidized bed where it stops the polymerization reaction.

In an alternate technique the driving force for expander 46 can be the feed gas for the reaction system. Thus referring to FIG. 2, wherein like parts are designated by like reference numerals monomer feed gas line 28 is provided with a valve 68 which controls the flow of feed gas to the reactor. Feed bypass line 62 having valve 64 controls the flow of feed gas to expander 46. When valve 68 is opened and valve 64 is closed, conventional polymerization takes place. However, when valve 68 is closed and valve 64 is open, the feed gas is directed through lines 62 and 66 into expander 46. Operation then beomes similar to the operation described in FIG. 1.

In a typical mode of operation and with reference to FIG. 1, when it is necessary to stop or "kill" the reaction, valve 54 is opened allowing gas from the reaction system to flow from line 52 through line 54 to expander 46. The flow of gas through the expander provides the power required to keep circulator 24 and motor 44 running at some reduced speed, usually about half the normal operating speed. Gas circulation is maintained through the reaction system, and the fluidized bed 12 is maintained in a fluidized state. The gas which is used to drive expander 46 passes through line 56, leaving the reaction system at relatively low pressure. Normally, this is a relatively small gas flow, and it can be disposed of in a conventional flare system or other means of disposal.

At essentially the same time that valve 54 is opened, valve 58 is also opened, allowing a gas or liquid which is a catalyst poison, such as carbon monoxide or carbon dioxide, to flow through line 60 and into line 29. The gas circulation maintained by the action of the expander carries the catalyst poison into the fluidized bed where it stops the polymerization reaction.

The following Examples will illustrate the present invention:

EXAMPLE 1

A conventional gas phase fluidized bed polyethylene reaction system such as disclosed in U.S. Pat. Nos. 4,482,687 or 4,302,566 is utilized and which is modified as shown in FIG. 1. The system contains a total gas volume of about 19,400 cubic feet.

The reactor is operating at a temperature of about 89° C. and is producing a polymer product which will begin to agglomerate if the bed temperature exceeds a temperature of about 102° C. Superficial gas velocity in the reactor is 2.0 ft/sec. The cycle gas circulator is equipped with a supplemental gas expander drive which uses gas from the reactor. In an electric power failure, a valve opens to start gas flow at a rate sufficient to maintain fluidization through the expander, e.g., about 25,000 lb/hr through the expander. The exhaust gas from the expander is routed to a small flare system which is used to dispose of miscellaneous process vents. The expander keeps the circulator operating at about half its normal speed, approximately 18000 RPM. Carbon monoxide is fed to the reaction system and is circulated through the bed within approximately 1 minute, completely stopping all reaction. The maximum temperature reached in any part of the bed is approximately 96° C.

COMPARATIVE EXAMPLE I

A gas phase fluidized bed reaction system identical to the one described above is utilized except it is not equipped with a gas expander. Instead, a large reactor vent line equipped with a shutoff valve is attached to the top of the reaction vessel and is routed to a large, dedicated flare system. A shutoff valve is provided in the cycle gas line between the reactor and the circulator. The reaction system is operating under conditions identical to those described in the foregoing example. In a power failure, the valve in the cycle gas line is closed, and the valve in the reactor vent line is opened. At the same time, carbon monoxide is injected into the bottom of the reactor below the fluidized bed. Gas is vented to the flare system at a flow rate of approximately 300,000 to 400,000 lb/hr. After approximately two minutes, the carbon monoxide has been distributed throughout the polymer bed, and all reaction has stopped. The maximum temperature reached in any part of the bed is approximately 102° C.

As will be seen from Comparative Example I, the gas flow to the flare system is at a factor of 10 greater than that required by the expander, and the rate greatly exceeds the capacity of the small flare system normally provided for disposal of miscellaneous process vent. Thus, a special, dedicated flare system is required so that the vented gas can be disposed of safely and in an environmentally acceptable manner.

What is claimed is:

1. A fluidized bed polymerization reaction system comprising a polymerization reactor, feeding means for introducing a feed gas into the reactor, first and second circulator means for circulating a recycle gas from and to said reactor, said first circulator means comprising a circulator driven by a motor, at least one cooling means for cooling said recycle gas, a kill gas entry means for delivering a kill gas to the reactor, gas driven second circulator means connected to said first circulator means for maintaining operation of said first circulator means during power failure, and valving means connected to said gas driven second circulator means for selectively directing said feed gas or recycle gas to said gas driven second circulator means.

2. Apparatus according to claim 1 wherein said gas driven second circulator means includes an expander.

* * * * *

UNITED STATES PATENT AND TRADEMARK OFFICE
CERTIFICATE OF CORRECTION

PATENT NO. : 5,399,320

DATED : March 21, 1995

INVENTOR(S) : Craddock et al

It is certified that error appears in the above-identified patent and that said Letters Patent is hereby corrected as shown below:

Column 8, line 41, change "Apparatus" to --System--.

Signed and Sealed this

Fourth Day of July, 1995

Attest:

BRUCE LEHMAN

Attesting Officer      Commissioner of Patents and Trademarks